United States Patent
Sakano

(10) Patent No.: US 10,006,818 B2
(45) Date of Patent: Jun. 26, 2018

(54) TEMPERATURE SENSOR, METHOD FOR CALIBRATING THE SAME, AND SEMICONDUCTOR DEVICE

(71) Applicant: ROHM CO., LTD., Ukyo-ku, Kyoto (JP)

(72) Inventor: Yoshihisa Sakano, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 204 days.

(21) Appl. No.: 15/175,474

(22) Filed: Jun. 7, 2016

(65) Prior Publication Data

US 2016/0363487 A1 Dec. 15, 2016

(30) Foreign Application Priority Data

Jun. 11, 2015 (JP) .................................. 2015-118304

(51) Int. Cl.
*G01K 15/00* (2006.01)
*G01K 7/01* (2006.01)

(52) U.S. Cl.
CPC ............ *G01K 15/005* (2013.01); *G01K 7/01* (2013.01)

(58) Field of Classification Search
None
See application file for complete search history.

(56) References Cited

U.S. PATENT DOCUMENTS

| 9,726,696 B2* | 8/2017 | Powell ............... G01R 19/0069 |
| 2007/0286259 A1* | 12/2007 | Kwon .................... G01K 7/015 374/170 |
| 2009/0009234 A1* | 1/2009 | St. Pierre ................. G01K 7/01 327/512 |
| 2014/0086277 A1* | 3/2014 | Sanchez ................ G01K 1/026 374/178 |

(Continued)

FOREIGN PATENT DOCUMENTS

| EP | 2295944 A2 | 3/2011 |
| WO | 2006030374 A2 | 3/2006 |

OTHER PUBLICATIONS

M. Pertijs et al., "A CMOS Smart Temperature Sensor With a 3 Inaccuracy of +/− 0.1 C From -55 C to 125 C" IEEE Journal of Solid-State Circuits, vol. 40, No. 12, Dec. 2005, pp. 2805-2815.

(Continued)

*Primary Examiner* — Andre Allen
(74) *Attorney, Agent, or Firm* — Cantor Colburn LLP

(57) ABSTRACT

A temperature sensor for generating bit stream having duty ratio depending on temperature, includes: voltage generator to receive control bit and output first voltage having CTAT characteristic when the control bit is in first state and to output second voltage having PTAT characteristic when the control bit is in second state; integrating circuit to integrate value obtained by multiplying input voltage with a first coefficient in the first state and to integrate value obtained by multiplying the input voltage with second coefficient in the second state; quantizer to generate the bit stream by quan- (Continued)

tizing an output of the integrating circuit; pattern generator which is enabled in calibration mode and generates test signal having predetermined duty ratio; and subtraction circuit which is enabled in the calibration mode and subtracts reference voltage for calibration from an output voltage of the voltage generator in the first state.

8 Claims, 5 Drawing Sheets

(56) References Cited

U.S. PATENT DOCUMENTS

| | | | |
|---|---|---|---|
| 2014/0086279 A1* | 3/2014 | Cao .................. | G01K 1/026 374/183 |
| 2014/0269839 A1* | 9/2014 | Tai ................... | G01K 7/34 374/184 |
| 2014/0354308 A1* | 12/2014 | Hong ................ | G01K 7/22 324/713 |
| 2014/0355651 A1* | 12/2014 | Hong ................ | G01K 7/16 374/170 |

OTHER PUBLICATIONS

M. Pertijs et al., "Low-Cost Calibration Techniques for Smart Temperature Sensors" IEEE Sensors Journal, vol. 10, No. 6, Jun. 2010, pp. 1098-1105.

* cited by examiner

FIG. 1A
(Related Art)
FIG. 1B
(Related Art)
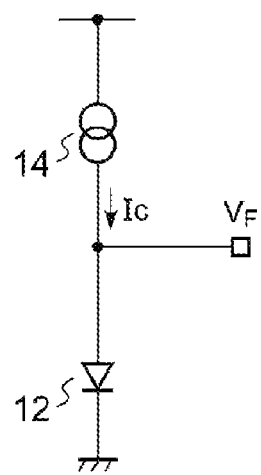
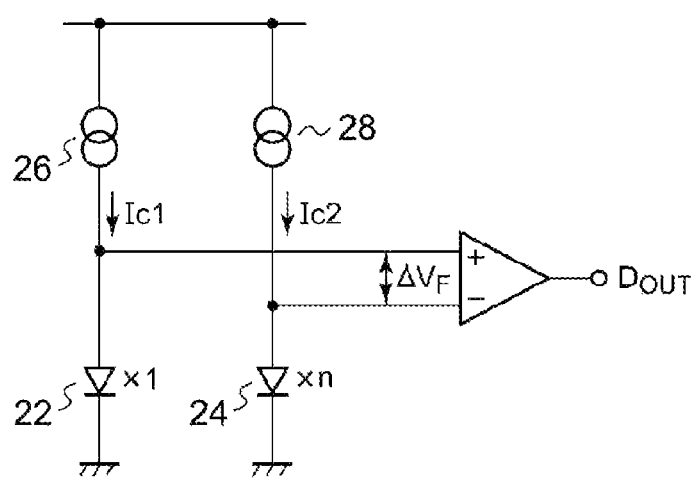

TEMPERATURE SENSOR, METHOD FOR CALIBRATING THE SAME, AND SEMICONDUCTOR DEVICE

CROSS-REFERENCE TO RELATED APPLICATION

This application is based upon and claims the benefit of priority from Japanese Patent Application No. 2015-118304, filed on Jun. 11, 2015, the entire contents of which are incorporated herein by reference.

TECHNICAL FIELD

The present disclosure relates to a temperature sensor.

BACKGROUND

A temperature sensor using the temperature dependency of a forward voltage Vf of a diode is known. FIGS. 1A and 1B are circuit diagrams illustrating the basic configuration of a temperature sensor. As illustrated in FIG. 1A, a temperature sensor 10 includes a diode 12 and a current source 14 for supplying a constant current Ic to the diode 12 and outputs a forward voltage (voltage drop) Vf of the diode 12. The output voltage Vf is expressed by the following equation (1). The diode 12 may be configured using a base-emitter junction of a bipolar transistor, in which case the output voltage Vf may be read as Vbe which is equivalent to Vf.

$$Vf = V_T \times \ln(Ic/I_S) \quad (1)$$

Where, $V_T = kT/q$, T is a temperature, k is a Boltzmann constant, q is an electronic elementary quantity and $I_S$ is a saturated current. It is noted that $I_S$ also has a temperature dependency. The temperature sensor 10 illustrated in FIG. 1A has a negative temperature characteristic CTAT (Complementary To Absolute Temperature). The temperature sensor 10 illustrated in FIG. 1A has a problem in that it is affected by variations of Ic and $I_S$.

A temperature sensor 20 illustrated in FIG. 1B includes diodes 22 and 24 and current sources 26 and 28 for supplying constant currents Id1 and Ic2 to the diodes 22 and 24. The current density flowing through the diode 24 is 1/n times as large as the current density flowing through the diode 22. For example, with Ic1=Ic2, the size of the diode 24 is n times the size of the diode 22. Alternatively, with Ic1=n×Ic2, the diode 22 and the diode 24 may be same in size.

The temperature sensor 20 outputs a difference ΔVf (=Vf1−Vf2) between a forward voltage Vf1 of the diode 22 and a forward voltage Vf2 of the diode 24. The difference ΔVf has the positive temperature characteristic PTAT (Proportional To Absolute Temperature) expressed by the following equation (2).

$$\Delta Vf = Vf1 - Vf2 = V_T \times \ln(n) \quad (2)$$

That is, in comparison with the temperature sensor 10 illustrated in FIG. 1A, the temperature sensor 20 illustrated in FIG. 1B is configured to be less affected by variations of Ic and $I_S$ than the temperature sensor 10 illustrated in FIG. 1A.

A temperature sensor is also known, which is obtained by combining the temperature sensor of FIG. 1A or 1B and a ΔΣA/D converter. FIG. 2 is a circuit diagram of a temperature sensor 30 including the temperature sensor of FIG. 1B and a ΔΣA/D converter. The temperature sensor 30 includes a temperature sensor 32, a reference voltage source 34 and a ΔΣA/D converter 36. The temperature sensor 32 may have the configuration of FIG. 1A or 1B. In this example, the temperature sensor 32 is the temperature sensor 20 of FIG. 1B. An output voltage $T_{OUT}$ of the temperature sensor 20 is expressed by the following equation (3).

$$T_{OUT} = \beta \times \Delta Vf = \beta \times V_T \times \ln(n) \quad (3)$$

The reference voltage source 34 generates a reference voltage $V_{REF}$ which is independent of temperature. The reference voltage source 34 is also called a band gap reference (BGR) circuit. It should be understood by those skilled in the art that the BGR circuit is configured with a combination of the temperature sensor 10 of FIG. 1A and the temperature sensor 20 of FIG. 1B. Specifically, when a voltage Vf having the CTAT characteristic and a voltage ΔVf having the PTAT characteristic are added at a rate where their temperature dependencies are cancelled by each other, the reference voltage $V_{REF}$ independent of temperature is generated.

$$V_{REF} = \alpha \times Vf + \beta \times \Delta Vf \quad (4)$$

The ΔΣA/D converter 36 converts the output voltage $T_{OUT}$ of the temperature sensor 32 into a bit stream bs. The configuration of the ΔΣA/D converter 36 is well known in the art and includes a subtracter 40, an integrator 42, a quantizer 44 and a one-bit D/A converter 46.

A digital output $D_{OUT}$ of the ΔΣA/D converter 36 is a duty ratio of the bit stream bs and is represented by $T_{OUT}/V_{REF}$.

$$D_{OUT} = T_{OUT}/V_{REF} = \beta \times \Delta Vf / V_{REF} \quad (5)$$

In the temperature sensor 30 of FIG. 2, the temperature sensor 32 and the reference voltage source 34 are configured separately from each other. Therefore, both of an error and variation of $T_{OUT}$ and an error and variation of $V_{REF}$ are included in the digital output $D_{OUT}$, which may be a factor of poor accuracy.

SUMMARY

The present disclosure provides some embodiments of a temperature sensor which is capable of measuring an error of the temperature sensor.

According to one embodiment of the present disclosure, there is provided a temperature sensor for generating a bit stream having a duty ratio depending on a temperature. The temperature sensor includes: a voltage generator which receives a control bit and is configured to output a first voltage (Vf) having a CTAT (Complementary to Absolute Temperature) characteristic when the control bit is in a first state and to output a second voltage (ΔVf) having a PTAT (Proportional to Absolute Temperature) characteristic when the control bit is in a second state; an integrating circuit configured to integrate a value obtained by multiplying an input voltage with a first coefficient (α) when the control bit is in the first state and to integrate a value obtained by multiplying the input voltage with a second coefficient (β) when the control bit is in the second state; a quantizer configured to generate the bit stream by quantizing an output of the integrating circuit; a pattern generator which is enabled in a calibration mode and is configured to generate a test signal having a predetermined duty ratio; and a subtraction circuit which is enabled in the calibration mode and is configured to subtract a reference voltage for calibration from an output voltage of the voltage generator when the bit stream is in the first state. (i) In a normal mode, the bit stream is input, as the control bit, to the voltage generator and the integrating circuit, and, (ii) in the calibration mode, the test signal is input, as the control bit, to the voltage generator and the integrating circuit.

Assuming that the reference voltage for calibration is $V_{EXT}$ and a duty ratio of the test signal is γ, the duty ratio $D_{OUT}$ of the bit stream in the calibration mode is expressed as follows.

$$D_{OUT} = \{\gamma \times \alpha \times Vf + (1-\gamma) \times \beta \times \Delta Vf)\}/V_{EXT}$$

When α, β and γ are set such that the numerator {γ×α×Vf+(1−γ)×β×ΔVf)} in the above expression becomes the reference voltage $V_{REF}$ independent of temperature, it is possible to measure an error of the reference voltage $V_{REF}$ even without precise control of an ambient temperature.

In some embodiments, the pattern generator may generate the test signal having a duty ratio of 50%.

In some embodiments, the pattern generator may generate the test signal alternating between a first state and a second state.

In some embodiments, the voltage generator may include: a first diode which is biased by a constant current; a second diode which is biased at a current density which is 1/n times the current density of the first diode; a switch which is provided in parallel to the second diode, the switch being switched on when the control bit is in the first state and being switched off when the control bit is in the second state; and a subtracter which subtracts a forward voltage of the second diode from a forward voltage of the first diode.

In some embodiments, the integrating circuit may include: a de-multiplexer including an input terminal which receives an input voltage to the integrating circuit, a first output terminal and a second output terminal, wherein the de-multiplexer outputs a voltage of the input terminal from the first output terminal when the control bit is in the first state, and outputs the voltage of the input terminal from the second output terminal when the control bit is in the second state; a first coefficient circuit which multiplies a voltage of the first output terminal of the de-multiplexer with the first coefficient (α); a second coefficient circuit which multiplies a voltage of the second output terminal of the de-multiplexer with the second coefficient (β); and an integrator which integrates output voltages of the first coefficient circuit and the second coefficient circuit.

According to another embodiment of the present disclosure, there is provided a semiconductor device including: a semiconductor substrate; and any one of the above-described temperature sensor which is integrated on the semiconductor substrate.

According to another embodiment of the present disclosure, there is provided a semiconductor device including: a voltage generator which receives a control bit and is configured to output a first voltage (Vf) having a CTAT (Complementary to Absolute Temperature) characteristic when the control bit is in a first state and to output a second voltage (ΔVf) having a PTAT (Proportional to Absolute Temperature) characteristic when the control bit is in a second state; an integrating circuit configured to integrate a value obtained by multiplying an input voltage with a first coefficient (α) when the control bit is in the first state and to integrate a value obtained by multiplying the input voltage with a second coefficient (β) when the control bit is in the second state; a quantizer configured to generate the bit stream by quantizing an output of the integrating circuit; a pattern generator which is enabled in a calibration mode and is configured to generate a test signal having a predetermined duty ratio; and a subtraction circuit which is enabled in the calibration mode and is configured to subtract a reference voltage for calibration from an output voltage of the voltage generator when the test signal is in the first state.

With this configuration, it is possible to measure an error of the reference voltage independent of a temperature.

Any combinations of the above-described elements or any modifications to the representations of the present disclosure between methods, apparatuses and systems are effective as embodiments of the present disclosure.

BRIEF DESCRIPTION OF THE DRAWINGS

FIGS. 1A and 1B are circuit diagrams illustrating a basic configuration of a temperature sensor.

DETAILED DESCRIPTION

Figure 2:
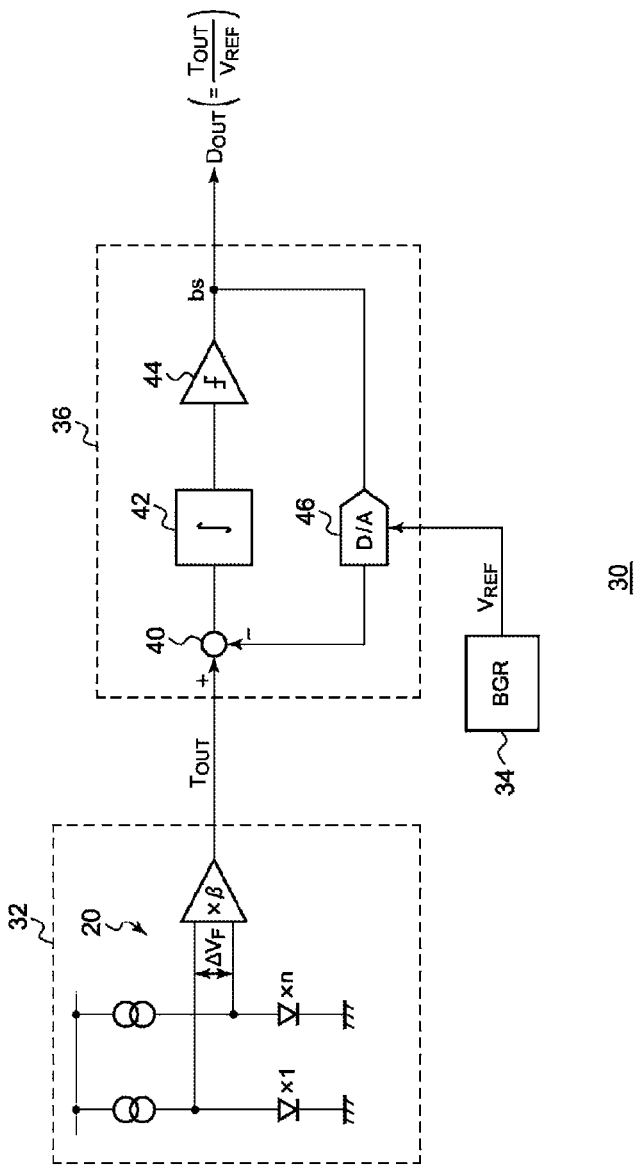
FIG. 2 is a circuit diagram of a temperature sensor including the temperature sensor of FIG. 1B and a ΔΣA/D converter.

One embodiment of the present disclosure will now be described in detail with reference to the drawings. Throughout the drawings, the same or similar elements, members and processes are denoted by the same reference numerals and explanation of which may not be repeated. The disclosed embodiments are provided for the purpose of illustration, not limitation, of the present disclosure and all features and combinations thereof described in the embodiments cannot be necessarily construed to describe the substance of the present disclosure.

In the specification, the phrase "connection of a member A and a member B" is intended to include direct physical connection of the member A and the member B as well as indirect connection thereof via another member as long as the other member has no substantial effect on the electrical connection of the member A and the member B or the other member does not impair functions and effects achieved by combining the member A and the member B. Similarly, the phrase "interposition of a member C between a member A and a member B" is intended to include direct connection of the member A and the member C or direct connection of the member B and the member C as well as indirect connection thereof via another member as long as the other member has no substantial effect on the electrical connection of the member A, the member B and the member C or the other member does not impair functions and effects achieve by combining the member A, the member B and the member C.

Figure 3:
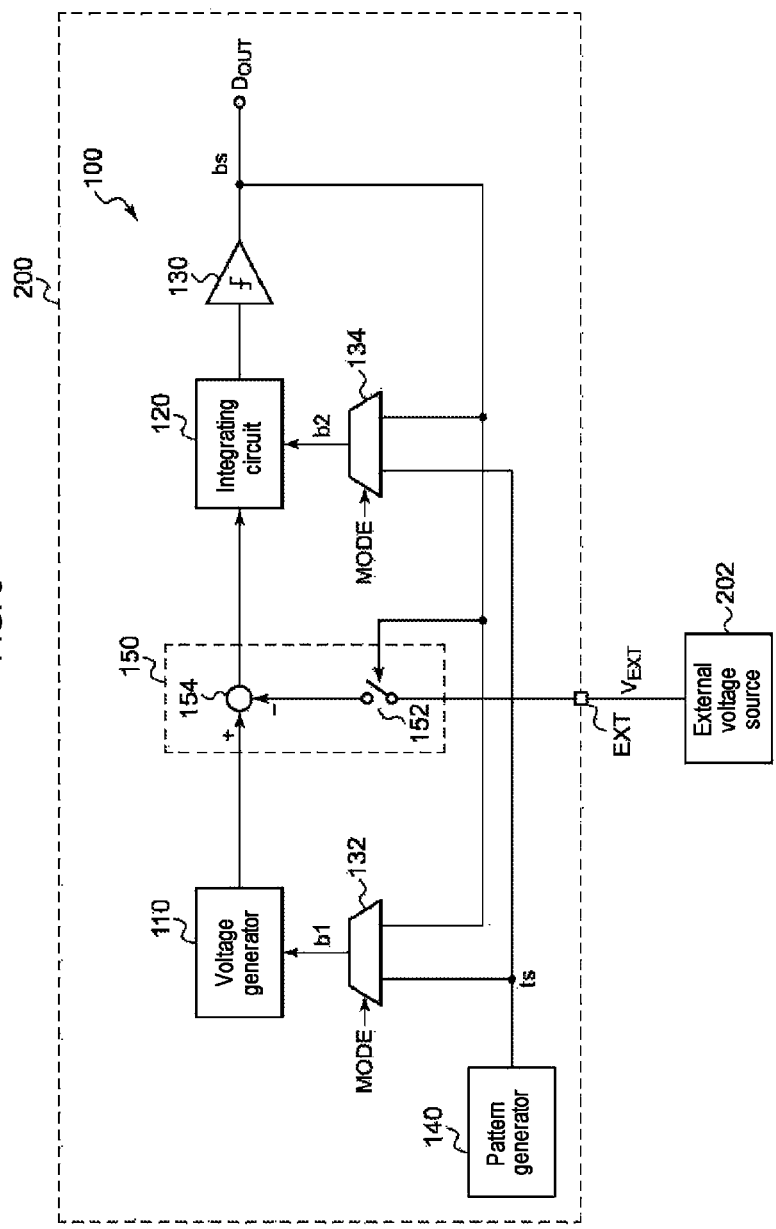
FIG. 3 is a circuit diagram illustrating a basic configuration of a temperature sensor according to an embodiment.

FIG. 3 is a circuit diagram illustrating a basic configuration of a temperature sensor 100 according to an embodiment. The temperature sensor 100 is integrated on a semiconductor substrate and forms a part of a semiconductor device 200. The semiconductor device 200 is available for applications requiring temperature measurement and temperature management, for example, temperature management during transportation of medical equipment, industrial equipment and food products, temperature management of laser diodes, temperature calibration of high precision cores, and the like. The temperature sensor 100 is available for other various applications and is not limited in its use.

The temperature sensor 100 outputs a bit stream bs having a duty ratio $D_{OUT}$ depending on a temperature in a normal mode.

The temperature sensor 100, which is referred to as a charge balancing system, is understood to use the common diode (bipolar transistor) for the reference voltage source 34 and temperature sensor 32 of FIG. 2. The temperature sensor 100 mainly includes a voltage generator 110, an integrating circuit 120, a quantizer 130, a pattern generator 140 and a subtraction circuit 150. The block diagram of FIG. 3 shows the structure or function of the temperature sensor 100 schematically and illustratively. However, the present disclosure is not limited to the block diagram of FIG. 3.

The voltage generator 110, the integrating circuit 120 and the quantizer 130 generate the bit stream bs in the normal mode.

The voltage generator 110 receives a control bit b1, and is configured to output a first voltage Vf having the CTAT (Complementary To Absolute Temperature) characteristic when the control bit b1 is in a first state (for example, a high level) and to output a second voltage ΔVf having the PTAT (Proportional To Absolute Temperature) characteristic when the control bit b1 is in a second state (for example, a low level). The first voltage Vf and the second voltage ΔVf are as described above with reference to FIGS. 1A and 1B and their temperature characteristics are expressed by the following equations (1) and (2), respectively.

$$Vf = V_T \times \ln(Ic/I_S) \qquad (1)$$

$$\Delta Vf = Vf1 - Vf2 = V_T \times \ln(n) \qquad (2)$$

The integrating circuit 120 receives a control bit b2 and is configured to integrate a value obtained by multiplying its own input voltage with a first coefficient α when the control bit b2 is in a first state (for example, a high level) and to integrate a value obtained by multiplying its own input voltage with a second coefficient β when the control bit b2 is in a second state (for example, a low level).

The quantizer 130 compares an output voltage $V_{INT}$ of the integrating circuit 120 with a threshold voltage and quantizes the output voltage $V_{INT}$ to generate the bit stream bs. In the normal mode, the bit stream bs is input to the voltage generator 110 and the integrating circuit 120, as the control bits b1 and b2, respectively.

The above is the configuration of the temperature sensor 100 in the normal mode. The temperature sensor 100 is configured to measure an error in a calibration mode. The configuration for the calibration mode will be described below.

In connection with the calibration mode, the temperature sensor 100 includes the pattern generator 140 and the subtraction circuit 150. The pattern generator 140 is enabled in the calibration mode, and is configured to generate a test signal ts having a predetermined duty ratio. The test signal ts is a bit stream having "1" (high level) and "0" (low level), like the bit stream bs.

The temperature sensor 100 is provided with an external (EXT) terminal. An external voltage source 202 is connected to the EXT terminal through which a reference voltage $V_{EXT}$ for calibration is input from the external voltage source 202 to the temperature sensor 100. The subtraction circuit 150 is enabled in the calibration mode and is configured to subtract the reference voltage $V_{EXT}$ for calibration from an output voltage Vf or ΔVf of the voltage generator 110 when the bit stream bs is in a first state (for example, a high level).

For example, the subtraction circuit 150 includes a switch 152 and a subtracter 154. The switch 152 is switched on when the bit stream bs is in a first state (high level), and outputs the reference voltage $V_{EXT}$ for calibration to the subtracter 154. This allows the subtracter 154 to perform a subtraction operation. The switch 152 is switched off when the bit stream bs is in a second state (low level), and outputs "0." In this case, the subtracter 154 performs no subtraction operation. The switch 152 corresponds to the one-bit D/A converter 46 of FIG. 2 and the subtracter 154 corresponds to the subtracter 40 of FIG. 2.

In the calibration mode, instead of the bit stream bs, the test signal ts is input to the voltage generator 110 and the integrating circuit 120, as the control bits b1 and b2, respectively.

A selector 132 is provided to switch the control bit b1 of the voltage generator 110 depending on a mode and a selector 134 is provided to switch the control bit b2 of the integrating circuit 120 depending on a mode. More specifically, the selector 132 selects the bit stream bs in the normal mode and outputs it to the voltage generator 110, while selecting the test signal ts in the calibration mode and outputting it to the voltage generator 110. The selector 134 selects the bit stream bs in the normal mode and outputs it to the integrating circuit 120, while selecting the test signal ts in the calibration mode and outputting it to the integrating circuit 120. The selectors 132 and 134 may be made in common. A means for switching a control bit to be supplied to the voltage generator 110 and the integrating circuit 120 is not limited to a selector but may be other circuits.

The above is the configuration of the temperature sensor 100. Subsequently, the operation thereof will be described.
(Normal Mode)

Figure 4A:
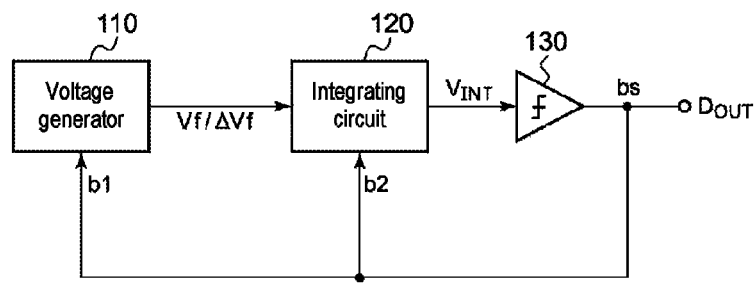
FIG. 4A is an equivalent circuit diagram of the temperature sensor of FIG. 3 in a normal mode.

To begin with, the operation of the normal mode will be described. FIG. 4A is an equivalent circuit diagram of the temperature sensor 100 of FIG. 3 in the normal mode. In a charge balancing system, the duty ratio $D_{OUT}$ of the bit stream bs is changed so as to balance the output voltage $V_{INT}$ of the integrating circuit 120. As a result, the following equation (6) is established.

$$D_{OUT} \times \alpha \times Vf = (1 - D_{OUT}) \times \beta \times \Delta Vf \qquad (6)$$

Solving for $D_{OUT}$, the equation (6) is changed to the following equation (7).

$$D_{OUT} = \beta \times \Delta Vf / (\alpha \times Vf + \beta \times \Delta Vf) \qquad (7)$$

Where, with attention on the denominator (α×Vf+β×ΔVf) in the right side of the equation (7), the first term α×Vf has the CTAT characteristic and the second term β×ΔVf has the PTAT characteristic. Here, α and β are set such that (α×Vf+β×ΔVf) becomes a reference voltage $V_{REF}$ having no temperature dependency. This reference voltage $V_{REF}$ corresponds to the reference voltage generated by the reference voltage source 34 of FIG. 2. It should be noted that the following equation (8) is equivalent to equation (4).

$$V_{REF} = \alpha \times Vf + \beta \times \Delta Vf \qquad (8)$$

Then, the equation (7) may be rewritten as the following equation (9).

$$D_{OUT} = \beta \times \Delta Vf / V_{REF} \qquad (9)$$

This is equivalent to the output of the temperature sensor 30 of FIG. 2.
(Calibration Mode)

Figure 4B:
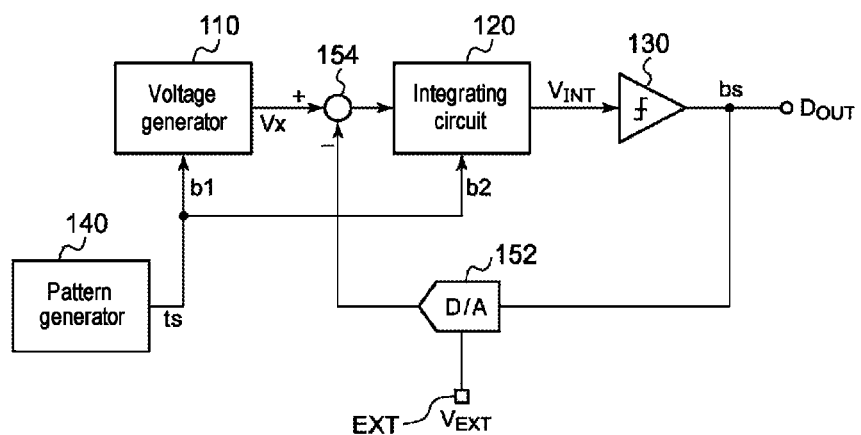
FIG. 4B is an equivalent circuit diagram of the temperature sensor of FIG. 3 in a calibration mode.

FIG. 4B is an equivalent circuit diagram of the temperature sensor 100 of FIG. 3 in the calibration mode. For example, the pattern generator 140 generates a test signal ts having a duty ratio γ. The duty ratio γ may be 50%. The test signal ts may be a bit stream alternating between a first state (high level) and a second state (low level).

An external reference voltage $V_{EXT}$ for calibration is applied to the EXT terminal. In some embodiments, the external reference voltage $V_{EXT}$ may be a target value of the reference voltage $V_{REF}$ in the equation (8).

In the calibration mode, the control bits b1 and b2 of the voltage generator 110 and the integrating circuit 120 are changed depending on the test signal ts. An output voltage $V_X$ of the voltage generator 110 at this time is equivalently expressed by the following equation (10).

$$V_X = \gamma \times \alpha \times Vf + (1-\gamma) \times \beta \times \Delta Vf \qquad (10)$$

When γ=50%, the following equation (11) is obtained.

$$V_X = 0.5 \times (\alpha \times Vf + \beta \times \Delta Vf) = 0.5 \times V_{REF} \qquad (11)$$

Where, the voltage $V_X$ is independent of temperature.

The temperature sensor 100 in the calibration mode is equivalent to the temperature sensor 30 of FIG. 2. Therefore, the duty ratio $D_{OUT}$ of the bit stream bs is expressed by the following equation (12).

$$D_{OUT} = V_X / V_{EXT} = 0.5 \times V_{REF} / V_{EXT} \qquad (12)$$

The external reference voltage $V_{EXT}$ for calibration is specified based on the target value of the reference voltage $V_{REF}$. Therefore, the duty ratio $D_{OUT}$ of the bit stream bs in the calibration mode represents an error of the reference voltage $V_{REF}$.

The above is the operation of the temperature sensor 100. With this temperature sensor 100, it is possible to measure the error of the reference voltage $V_{REF}$ by equivalently generating the voltage $V_X$ depending on the reference voltage $V_{REF}$ based on the test signal ts in the calibration mode.

It is possible to calibrate the temperature sensor 100 by correcting the coefficients α and β or appropriately trimming circuit elements constituting the temperature sensor 100 based on the measured error. Alternatively, the temperature sensor 100 may be calibrated in a digital manner by correcting the duty ratio $D_{OUT}$ of the bit stream bs at the subsequent state of the temperature sensor 100.

Here, since the reference voltage $V_{REF}$ has no temperature dependency, there is no need to manage the temperature of the temperature sensor 100 and the semiconductor device 200 with high precision in the calibration operation. This can result in significant reduction of time and costs required for the calibration. Such an advantage becomes more apparent than conventional techniques. In order to calibrate the temperature sensor of FIG. 1A or 1B or FIG. 2, there is a need to calibrate the output of the temperature sensor after stabilizing the temperature of the temperature sensor to a predetermined value. In this case, costs are increased since there is a need to provide a device for regulating the temperature, and calibration time is lengthened since it takes a time to stabilize the temperature. The temperature sensor 100 according to this embodiment can overcome this problem.

The present disclosure is understood from the block diagram or circuit diagram of FIG. 3 and is intended to cover various devices and circuits derived from the above description, without being limited to particular configurations. Hereinafter, more specific configuration examples will be described for the purpose of easy and clear understanding of the spirit and circuit operation of the present disclosure rather than a limitation in the scope of the present disclosure.

Figure 5:
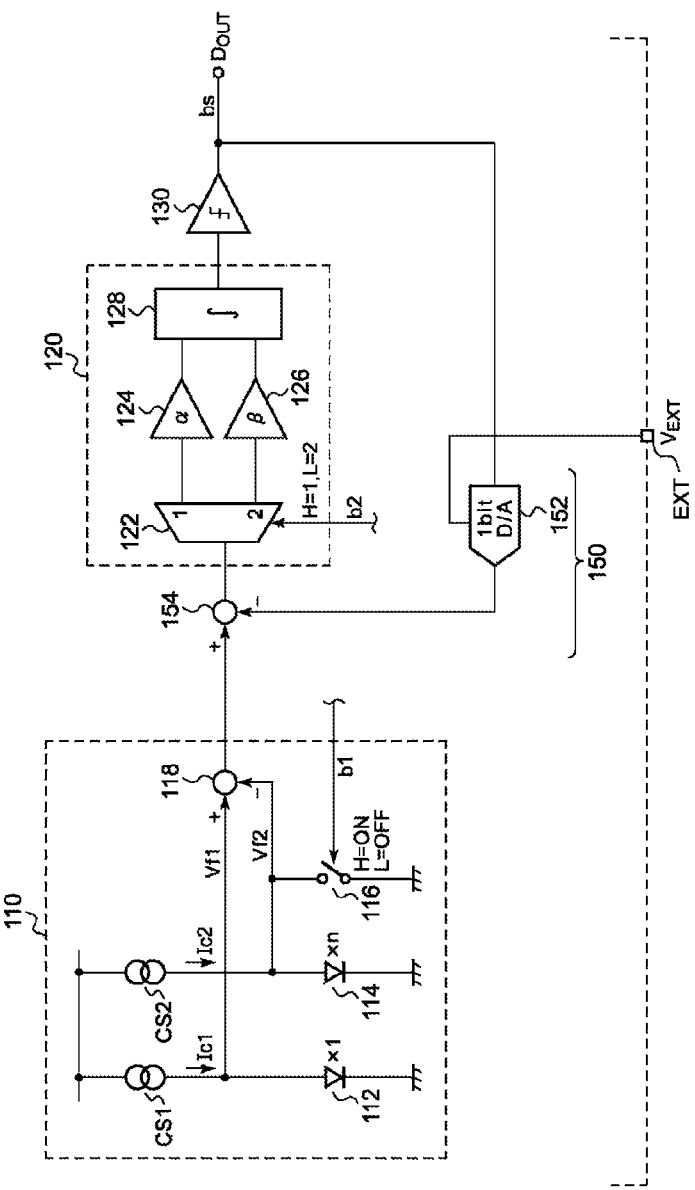
FIG. 5 is a circuit diagram illustrating a configuration of a temperature sensor.

FIG. 5 is a circuit diagram illustrating a configuration of the temperature sensor 100. The temperature sensor 100 includes a first diode 112, a second diode 114, a switch 116 and a subtracter 118. The first diode 112 is connected to a current source CS1 and is biased by a constant current Ic1. The second diode 114 is connected to a current source CS2 and is biased at a current density which is 1/n times the current density of the first diode 112. For example, with Ic1=Ic2, the size of the second diode 114 may be n times the size of the first diode 112.

The switch 116 is connected in parallel to the second diode 114. The switch 116 is switched on when the control bit b1 is in the first state (high level), and is switched off when the control bit b1 is in the second state (low level). The subtracter 118 subtracts a forward voltage Vf2 of the second diode 114 from a forward voltage Vf1 of the first diode 112.

When the control bit b1 has the high level, Vf2=0. Therefore, the output of the voltage generator 110 is Vf1=Vf. When the control bit b1 has the low level, the output of the voltage generator 110 is Vf1−Vf2=ΔVf.

For example, the voltage generator 110 may be configured in different ways. The switch 116 may be replaced with a multiplexer or a selector. The first diode 112 and the second diode 114 may be replaced with a bipolar transistor with its base and collector interconnected.

The integrating circuit 120 includes a de-multiplexer 122, a first coefficient circuit 124, a second coefficient circuit 126 and an integrator 128. The de-multiplexer 122 has an input terminal I which receives an input voltage to the integrating circuit 120, a first output terminal 1 and a second output terminal 2. The de-multiplexer 122 outputs a voltage of the input terminal from the first output terminal 1 when the control bit b2 is in the first state (high level), and outputs the voltage of the input terminal from the second output terminal 2 when the control bit b2 is in the second state (low level).

The first coefficient circuit 124 multiplies a voltage of the first output terminal 1 of the de-multiplexer 122 with a first coefficient α. The second coefficient circuit 126 multiplies a voltage of the second output terminal 2 of the de-multiplexer 122 with a second coefficient β. The integrator 128 accumulatively adds (integrates) output voltages of the first and second coefficient circuits 124 and 126. The integrator 128 may be configured with a known circuit such as a switched capacitor filter or the like. The configuration of the integrating circuit 120 is not limited to that illustrated in FIG. 5.

The present disclosure describes some embodiments as above. The disclosed embodiments are exemplary, and thus, it should be understood by those skilled in the art that various modifications to combinations of the elements or processes above may be made and such modifications will also fall within the scope of the present disclosure. Some exemplary modifications will be described below.

(First Modification)

The temperature sensor 100 may be normalized such that one of the coefficients α and β becomes a unity.

(Second Modification)

In the semiconductor device 200 according to the above embodiment, it has been illustrated that a circuit for measuring an error of the reference voltage $V_{REF}$ having no temperature dependency is incorporated in the temperature sensor 100. However, the present disclosure is not limited to the embodiment, but may be widely used to measure an error of the reference voltage $V_{REF}$ expressed by the above equation (4). In other words, the operation in the normal mode is not limited to that in the disclosed embodiment.

Third Embodiment

Although a configuration using a first-order ΔΣ modulator has been illustrated in the above embodiment, the present disclosure may be applied to a configuration using a higher-order ΔΣ modulator.

According to the present disclosure in some embodiments, it is possible to measure an error of a temperature sensor.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A temperature sensor for generating a bit stream having a duty ratio depending on a temperature, comprising:
    a voltage generator configured to receive a control bit and output a first voltage (Vf) having a CTAT (Complementary to Absolute Temperature) characteristic when the control bit is in a first state and to output a second voltage (ΔVf) having a PTAT (Proportional to Absolute Temperature) characteristic when the control bit is in a second state;
    an integrating circuit configured to integrate a value obtained by multiplying an input voltage with a first coefficient (α) when the control bit is in the first state and to integrate a value obtained by multiplying the input voltage with a second coefficient (β) when the control bit is in the second state;
    a quantizer configured to generate the bit stream by quantizing an output of the integrating circuit;
    a pattern generator which is enabled in a calibration mode and is configured to generate a test signal having a predetermined duty ratio; and
    a subtraction circuit which is enabled in the calibration mode and is configured to subtract a reference voltage for calibration from an output voltage of the voltage generator when the bit stream is in the first state,
    wherein, (i) in a normal mode, the bit stream is input, as the control bit, to the voltage generator and the integrating circuit, and, (ii) in the calibration mode, the test signal is input, as the control bit, to the voltage generator and the integrating circuit.

2. The temperature sensor of claim 1, wherein the pattern generator generates the test signal having a duty ratio of 50%.

3. The temperature sensor of claim 1, wherein the pattern generator generates the test signal alternating between a first state and a second state.

4. The temperature sensor of claim 1, wherein the voltage generator includes:
    a first diode which is biased by a constant current;
    a second diode which is biased at a current density which is 1/n times a current density of the first diode;
    a switch which is provided in parallel to the second diode, the switch being switched on when the control bit is in the first state and being switched off when the control bit is in the second state; and
    a subtracter which subtracts a forward voltage of the second diode from a forward voltage of the first diode.

5. The temperature sensor of claim 1, wherein the integrating circuit includes:
    a de-multiplexer including an input terminal which receives an input voltage to the integrating circuit, a first output terminal and a second output terminal, the de-multiplexer outputting a voltage of the input terminal from the first output terminal when the control bit is in the first state and outputting the voltage of the input terminal from the second output terminal when the control bit is in the second state;
    a first coefficient circuit configured to multiply a voltage of the first output terminal of the de-multiplexer with the first coefficient (α);
    a second coefficient circuit configured to multiply a voltage of the second output terminal of the de-multiplexer with the second coefficient (β); and
    an integrator which integrates output voltages of the first coefficient circuit and the second coefficient circuit.

6. A semiconductor device comprising:
    a semiconductor substrate; and
    a temperature sensor of claim 1, which is integrated on the semiconductor substrate.

7. A method for calibrating a temperature sensor which generates a bit stream having a duty ratio depending on a temperature, the temperature sensor comprising: a voltage generator configured to receive a control bit and output a first voltage (Vf) having a CTAT (Complementary to Absolute Temperature) characteristic when the control bit is in a first state and output a second voltage (ΔVf) having a PTAT (Proportional to Absolute Temperature) characteristic when the control bit is in a second state; an integrating circuit configured to integrate a value obtained by multiplying an input voltage with a first coefficient (α) when the control bit is in the first state and integrate a value obtained by multiplying the input voltage with a second coefficient (β) when the control bit is in the second state; and a quantizer configured to generate the bit stream by quantizing an output of the integrating circuit, the method comprising:
    generating a test signal having a predetermined duty ratio;
    supplying the test signal, as the control bit, to the voltage generator and the integrating circuit; and
    subtracting a reference voltage for calibration from an output voltage of the voltage generator when the bit stream is in the first state.

8. A semiconductor device comprising:
    a voltage generator which receives a control bit and is configured to output a first voltage (Vf) having a CTAT (Complementary to Absolute Temperature) characteristic when the control bit is in a first state and to output a second voltage (ΔVf) having a PTAT (Proportional to Absolute Temperature) characteristic when the control bit is in a second state;
    an integrating circuit configured to integrate a value obtained by multiplying an input voltage with a first coefficient (α) when the control bit is in the first state and to integrate a value obtained by multiplying the input voltage with a second coefficient β when the control bit is in the second state;
    a quantizer configured to generate a bit stream by quantizing an output of the integrating circuit;
    a pattern generator configured to generate the control bit having a predetermined duty ratio; and
    a one-bit D/A converter configured to subtract a reference voltage for calibration from an output voltage of the voltage generator when the bit stream is in the first state.

* * * * *